United States Patent
Zeng

(10) Patent No.: US 10,783,020 B2
(45) Date of Patent: Sep. 22, 2020

(54) METHOD FOR INVOKING COMPONENT, AND TERMINAL

(71) Applicant: GUANGDONG OPPO MOBILE TELECOMMUNICATIONS CORP., LTD., Dongguan, Guangdong (CN)

(72) Inventor: Yuanqing Zeng, Guangdong (CN)

(73) Assignee: GUANGDONG OPPO MOBILE TELECOMMUNICATIONS CORP., LTD., Guangdong, Dongguan (CN)

(*) Notice: Subject to any disclaimer, the term of this patent is extended or adjusted under 35 U.S.C. 154(b) by 0 days.

(21) Appl. No.: 16/719,487

(22) Filed: Dec. 18, 2019

(65) Prior Publication Data

US 2020/0125431 A1 Apr. 23, 2020

Related U.S. Application Data

(63) Continuation of application No. PCT/CN2017/091385, filed on Jun. 30, 2017.

(51) Int. Cl.
| | |
|---|---|
| *G06F 3/00* | (2006.01) |
| *G06F 9/54* | (2006.01) |
| *G06F 11/30* | (2006.01) |
| *G06F 11/34* | (2006.01) |
| G06N 20/00 | (2019.01) |
| G06F 17/11 | (2006.01) |

(52) U.S. Cl.
CPC .......... *G06F 9/548* (2013.01); *G06F 11/3006* (2013.01); *G06F 11/3452* (2013.01); *G06F 17/11* (2013.01); *G06F 2209/541* (2013.01); G06N 20/00 (2019.01)

(58) Field of Classification Search
CPC ..................................................... G06F 9/541

USPC ......................................................... 719/328
See application file for complete search history.

(56) References Cited

U.S. PATENT DOCUMENTS

| | | | |
|---|---|---|---|
| 2003/0056199 A1 | 3/2003 | Li et al. | |
| 2008/0148242 A1* | 6/2008 | Cobb ................. | G06F 11/3466 717/130 |

(Continued)

FOREIGN PATENT DOCUMENTS

| | | |
|---|---|---|
| CN | 101916321 | 12/2010 |
| CN | 105765560 | 7/2016 |

(Continued)

OTHER PUBLICATIONS

Yandong Mao, Software fault isolation with API integrity and multi-principal modules. (Year: 2011).*

(Continued)

*Primary Examiner* — Lechi Truong
(74) *Attorney, Agent, or Firm* — Hodgson Russ LLP

(57) ABSTRACT

The present disclosure provides a method for invoking a component, comprising sending the fourth number of times, the first running time, the second number of times and the third number of times to the server, respectively; obtaining the coefficient of the second component invoking the first component from the server; receiving a request that the second component request to invoke the first component, prohibiting the request in response to that the coefficient is less than a preset threshold. The present disclosure also provides a method for calculating a coefficient, a device, an invoking component device, a storage medium, a server and a terminal.

20 Claims, 16 Drawing Sheets

(56) References Cited

U.S. PATENT DOCUMENTS

| | | | |
|---|---|---|---|
| 2008/0154776 A1 | 6/2008 | Xia et al. | |
| 2014/0089736 A1 | 3/2014 | Okada | |
| 2018/0373510 A1* | 12/2018 | Chung | G06F 8/443 |
| 2020/0145421 A1* | 5/2020 | Tin | H04L 63/102 |

FOREIGN PATENT DOCUMENTS

| | | |
|---|---|---|
| CN | 105843686 | 8/2016 |
| CN | 106203068 | 12/2016 |

OTHER PUBLICATIONS

WIPO, ISR for PCT/CN2017/091385, dated Mar. 28, 2018.
EPO, Office Action for EP Application No. 17915968.6, dated May 27, 2020.

* cited by examiner

METHOD FOR INVOKING COMPONENT, AND TERMINAL

CROSS-REFERENCE TO RELATED APPLICATION

This application is a continuation of International Application No. PCT/CN2017/091385, filed Jun. 30, 2017, the entire disclosure of which is incorporated herein by reference.

TECHNICAL FIELD

The present disclosure relates to communication technologies, and particularly to a method for invoking a component, and a terminal.

BACKGROUND

With the rapid development of terminal technology, more and more applications can be supported by terminal. A large number of applications can be installed on the terminal. For example, hundreds of applications can be installed on the terminal.

In the applications installed on the terminal, different applications can invoke component each other. When different applications invoke each other, it is implemented by invoking one or more components in other applications. But invokes between different applications are often unnecessary. At this point, the invoked application (or component) occupies system resources in the terminal, resulting in low operating efficiency of the terminal.

SUMMARY

Therefore, the present disclosure provides a method for calculating a coefficient, a method for invoking a component, a device, a storage medium, a server and a terminal, it can improve the operation efficiency of a terminal.

In a first aspect, the embodiment of the present disclosure provides a method for calculating a coefficient, which is applied to a server. The method includes:

acquiring a first number of times that a first component has been invoked and a historical running time of an application to which the first component belongs;

calculating a component weight of the first component according to the first number of times and the historical running time;

acquiring a second number of times that the first component has been invoked by a second component and a third number of times that all components have been invoked by the second component, wherein the second component and the first component belong to different applications;

calculating a coefficient of the second component invoking the first component according to the component weight, the second number of times and the third number of times.

The embodiment of the disclosure also provides a method for invoking a component, the method includes:

a server acquiring, from a terminal, a first number of times that a first component has been invoked and a historical running time of an application to which the first component belongs;

calculating a component weight of the first component according to the first number of times and the historical running time;

the server acquiring, from the terminal a second number of times that the first component has been invoked by a second component and a third number of times that all components have been invoked by the second component, wherein the second component and the first component belong to different applications;

calculating a coefficient of the second component invoking the first component, according to the component weight, the second number of times and the third number of times;

the server sending the coefficient to the terminal;

the terminal prohibiting a request that the second component request to invoke the first component, in response to the coefficient is less than a preset threshold.

The embodiment of the disclosure also provides a method for invoking a component, which is applied to a terminal, the method includes:

acquiring a fourth number of times that a first component has been invoked and a first running time of an application to which the first component belongs;

acquiring a second number of times that the first component has been invoked by a second component and a third number of times that all components have been invoked by the second component, wherein the second component and the first component belong to different applications;

sending the fourth number of times, the first running time, the second number of times and the third number of times to a server, respectively;

acquiring a coefficient of the second component invoking the first component from the server;

receiving a request that the second component request to invoke the first component, prohibiting the request in response to that the coefficient is less than a preset threshold.

The embodiment of the disclosure also provides a coefficient calculating device, which is applied to a server, the device includes:

a first acquiring module, configured to acquire a first number of times that a first component has been invoked and a historical running time of an application to which the first component belongs;

a first calculating module, configured to calculate a component weight of the first component according to the first number of times and the historical running time;

a second acquiring module, configured to acquire a second number of times that the first component has been invoked by a second component and a third number of times that all components have been invoked by the second component, wherein the second component and the first component belong to different applications;

a second calculating module, configured to calculate a coefficient of the second component invoking the first component according to the component weight, the second number of times and the third number of times.

The embodiment of the disclosure also provides the following technical solution.

A component invoking device, which is applied to a terminal, includes:

a third acquiring module, configured to acquire a fourth number of times that a first component has been invoked and a first running time of an application to which the first component belongs;

a fourth acquiring module, configured to acquire a second number of times that the first component has been invoked by a second component and a third number of times that all components have been invoked by the second component, wherein the second component and the first component belong to different applications;

a sending module, configured to send the fourth number of times, the first running time, the second number of times and the third number of times to a server, respectively;

a fifth acquiring module, configured to acquire a coefficient of the second component invoking the first component from the server;

a prohibiting module, configured to prohibit the second component from invoking the first component when the coefficient is less than the preset threshold.

The embodiment of the disclosure also provides the following technical solution.

A storage medium with instructions stored therein. When the instruction is executed by a processor, the method for calculating a coefficient described in the embodiment of the disclosure is performed.

The embodiment of the disclosure also provides the following technical solution.

A storage medium with instructions stored therein. When the instruction is executed by a processor, the method for invoking a component described in the embodiment of the disclosure is performed.

The embodiment of the disclosure also provides the following technical solution.

A server, includes a processor and a memory, the processor is connected to the memory, the memory is configured to store instructions, when the instructions stored in the memory are invoked, the processor is configured to execute the steps of:

acquiring a first number of times that a first component has been invoked and a historical running time of an application to which the first component belongs;

calculating a component weight of the first component according to the first number of times and the historical running time;

acquiring a second number of times that the first component has been invoked by a second component and a third number of times that all components have been invoked by the second component, wherein the second component and the first component belong to different applications;

calculating a coefficient of the second component invoking the first component according to the component weight, the second number of times and the third number of times.

The embodiment of the disclosure also provides the following technical solution.

A terminal, includes a processor and a memory, the processor is connected to the memory, the memory is configured to store instructions, when the instructions stored in the memory are invoked, the processor is configured to execute the steps of:

acquiring a fourth number of times that a first component has been invoked and a first running time of an application to which the first component belongs;

acquiring a second number of times that the first component has been invoked by a second component and a third number of times that all components have been invoked by the second component, wherein the second component and the first component belong to different applications;

sending the fourth number of times, the first running time, the second number of times and the third number of times to a server, respectively;

acquiring a coefficient of the second component invoking the first component from the server;

receiving a request that the second component request to invoke the first component, and prohibiting the request in response to that the coefficient is less than a preset threshold

BRIEF DESCRIPTION OF THE DRAWINGS

Specific embodiments of the present disclosure will be described in detail below with reference to the drawings, to enable the technical solutions and other advantageous effects of the present disclosure are apparent.

DETAILED DESCRIPTION

Figure 1:
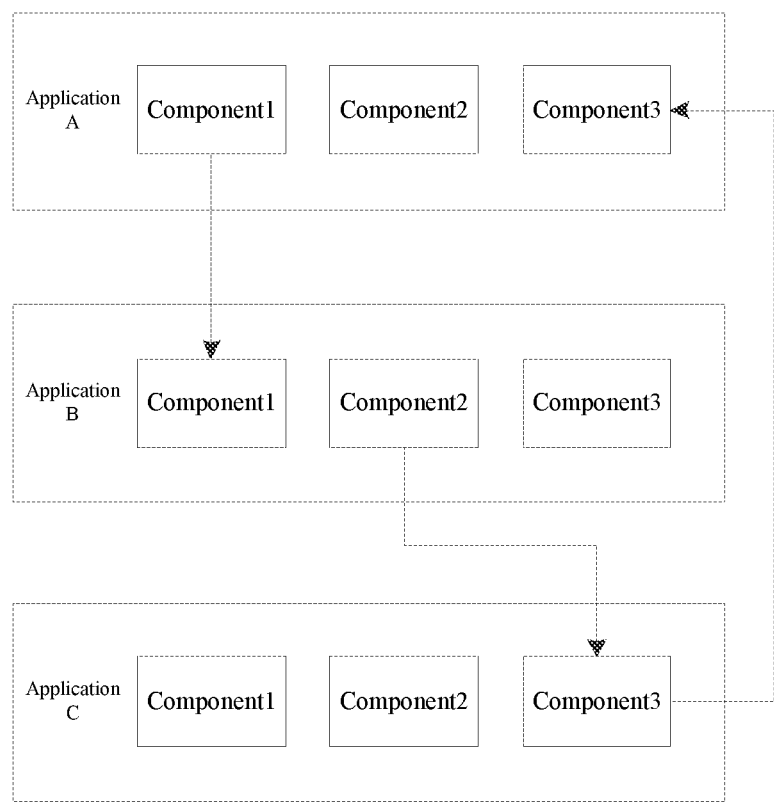
FIG. 1 is a schematic view showing components of applications in a terminal being invoked each other according to an embodiment of the present disclosure.

The following is a clear and complete description of the technical scheme in the embodiment of the invention in combination with the attached drawings in the embodiment of the invention. Obviously, the embodiments described are only partial embodiments of the present invention and not all embodiments. Based on the embodiment of the invention, all other embodiments can be obtained by the technical personnel in the field without any creative labor fall within the protection scope of the invention.

The terms "first", "second", "third", if any, described in the specification, the claims and the drawing of the invention are used to distinguish similar objects and are not used to describe a particular order or sequence. It should be understood that the objects so described are interchangeable in appropriate circumstances. Furthermore, the terms "include" and "comprise" and any variation thereof are intended to cover non-exclusive inclusions. For example, contains a series of steps of the process, methods, or contains a series of module or unit equipment, terminal, system is not limited to those listed clearly steps or unit or module, can also include steps or not clearly listed module or unit, also can include for these processes, methods, equipment, terminal or system inherent in other steps or unit or module.

Detailed description is as follows.

In this embodiment, the processing device of the radio frequency interference is described. The processing device of the radio frequency interference may be integrated into an electronic device, such as a mobile phone, a tablet computer, a personal digital assistant (PDA), or the like.

Referring to FIG. 1, FIG. 1 is a schematic view showing components of several applications in a terminal are invoked each other according to an embodiment of the present disclosure. Wherein the terminal has an application A, an application B, and an application C installed therein. For example, the application A can be Taobao application, the application B can be Alipay application, and the application C can be Tmall application. The application A, the application B, and the application C each can include a number of components. The components can be classified into four categories: Activities, Services, Receivers, and Providers. The Activity is a component for a user interface, the Service, the Receiver and the Provider are components that run in the background of the terminal. For example, the application A, the application B, and the application C each include three components, i.e., a component 1, a component 2, and a component 3.

The component 1 in the application A can invoke the component 1 in the application B. The component 2 in the application B can invoke the component 3 in the application C. The component 3 in the application C can invoke the component 3 in the application A. It is understood that, a first component in one application is invoked by a second component in another application, that means, the second component is also invoked by the first component.

Figure 2:
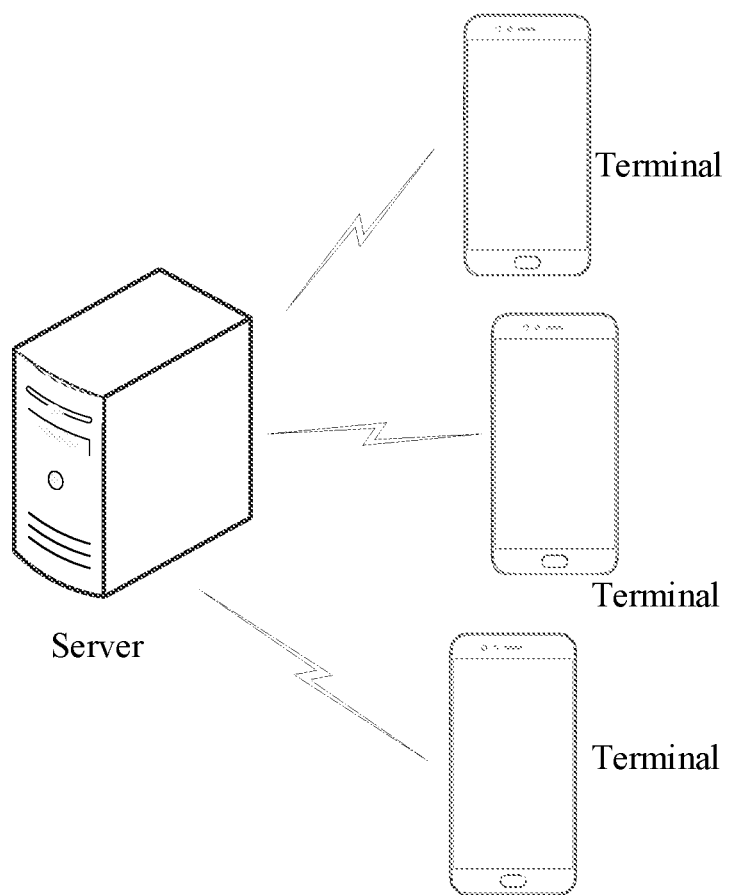
FIG. 2 is a schematic view showing the communication between a terminal and a server according to an embodiment of the present disclosure.

Referring to FIG. 2, FIG. 2 is a schematic view showing the communication between a terminal and a server according to an embodiment of the present disclosure. The terminal can communicate with the server through wireless communication network. The server can communicate with multiple terminals simultaneously.

Figure 3:
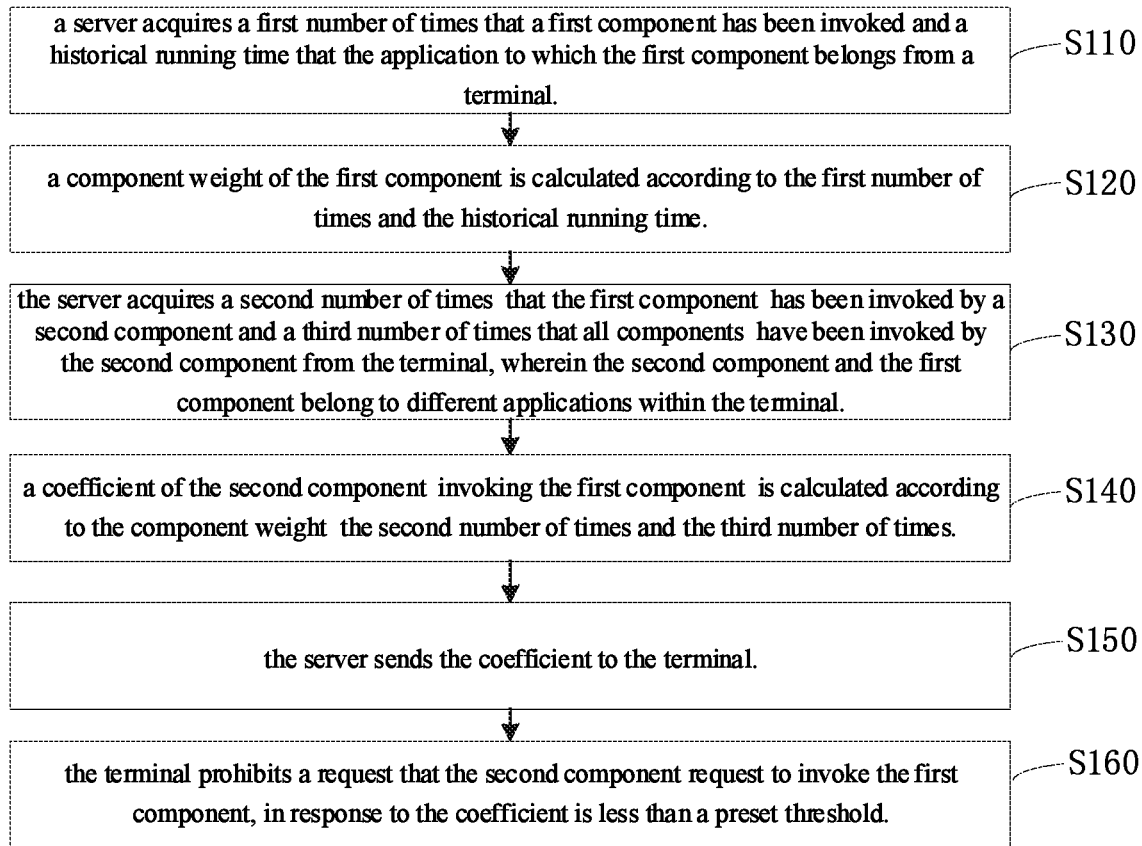
FIG. 3 is a flowchart of a method for calculating a coefficient according to an embodiment of the present disclosure.

An embodiment of the present disclosure provides a method for invoking a component. As illustrated in FIG. 3, the method includes the following steps.

In a step S110, a server acquires a first number of times Cj that a first component j has been invoked and a historical running time Tk that the application k to which the first component j belongs are acquired, from a terminal.

The first component j is a component in the application. The first component can be any kind of components of Activities, Services, Receivers, and Providers. The server acquires the first number of times Cj that the first component j has been invoked by other components. The first number of times includes the times that the first component j has been invoked by the components of other applications. In one embodiment, the first number of times further includes the times that the first component j has been invoked by the other components of the application k itself.

On the other hand, the server can also acquire the historical running time Tk of the application k to which the first component j belongs. Wherein, the historical running time is the sum of every running time since the application was installed, but not limited to the running time in which the application was invoked.

In a step S120, a component weight Wj of the first component j is calculated according to the first number of times Cj and the historical running time Tk.

The component weight Wj is a parameter determined by the number of times that the first component j has been invoked and the historical running time of the application k to which the first component j belongs. The component weight is a parameter of the first component itself, and used to represent the relationship between the number of times of the first component has been invoked and the historical running time of the application to which the first component belongs. The component weight of different components in an application can be different. After the server acquires the first number of times and the historical running time, the component weight is calculated according to the first number of times and the historical running time.

In a step S130, the server acquires a second number of times Nj that the first component j has been invoked by a second component i and a third number of times N that all components (referred to as a collection M) have been invoked by the second component, from the terminal, wherein the second component i and the first component j belong to different applications within the terminal.

Wherein, the server can acquire the second number of times Nj that the first component j has been invoked by the second component i. The second component and the first component belong to different applications. On the other hand, the server can acquire the third number of times N that all components have been invoked by the second component i. The third number of times N is the sum of all the times that the second component invokes every component.

In one embodiment, the server can acquire the number of times that each component has been invoked by the second component, and then determine the sum of the number of times invoking each component as the third number of times.

In a step S140, a coefficient $\omega_{ij}$ of the second component i invoking the first component j is calculated according to the component weight Wj, the second number of times Nj and the third number of times N.

After the server acquires the second number of times Nj and the third number of times N, the coefficient $\omega_{ij}$ of the second component i invoking the first component j is calculated according to the component weight Wj, the second number of times Nj and the third number of times N.

In a step S150, the server sends the coefficient to the terminal.

In a step S160, the terminal prohibits a request that the second component request to invoke the first component, in response to the coefficient is less than a preset threshold.

In the method for invoking a component provided by the embodiment of the disclosure, after the coefficient of the second component invoking the first component is calculated, the terminal can control the invoking between components according to the coefficient, so as to reduce the resource waste in the terminal system and improve the efficiency of the terminal.

Figure 4:
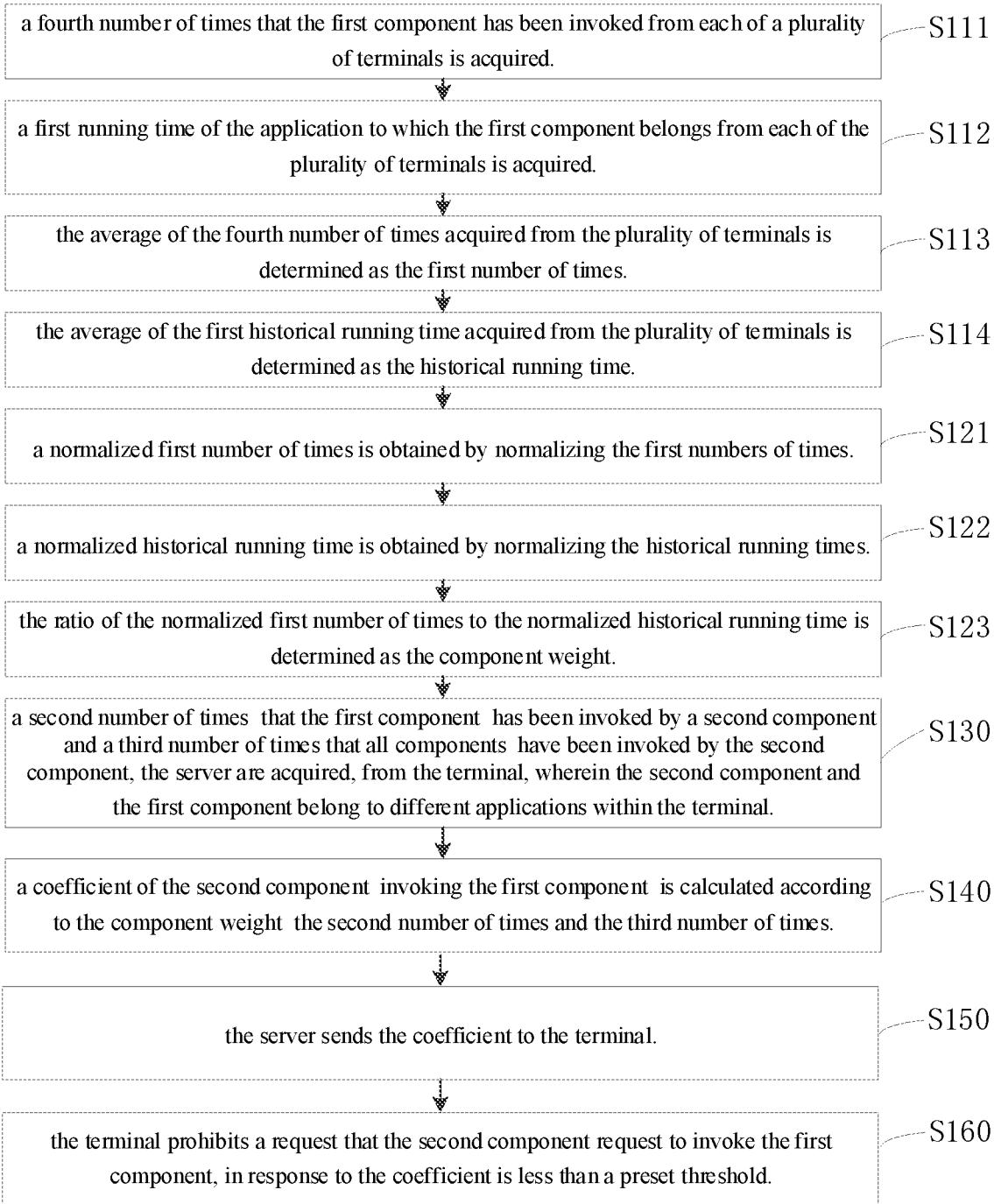
FIG. 4 is another flowchart of a method for calculating a coefficient according to an embodiment of the present disclosure.

In one embodiment, as illustrated in FIG. 4, in the step of S110, the operation of acquiring the first number of times that the first component has been invoked and a historical running time of the application to which the first component belongs comprises the following steps:

In a step S111, a fourth number of times that the first component has been invoked from each of a plurality of terminals is acquired.

In a step S112, a first running time of the application to which the first component belongs from each of the plurality of terminals is acquired.

In a step S113, the average of the fourth number of times acquired from the plurality of terminals is determined as the first number of times.

In a step S114, the average of the first historical running time acquired from the plurality of terminals is determined as the historical running time.

Wherein, the server can communicate with the plurality of terminals, the application k including the first component j is installed on the plurality of terminals. The server can acquire the fourth number of times C that the first component j has been invoked from each of the plurality of terminals. The fourth number of times C includes the number of times that the first component j has been invoked by all the components in the other applications.

The server can also acquire the first running time of the application to which the first component belongs from each of the plurality of terminals. Wherein, the first running time is the sum of every running time since the application was installed, but not limited to the running time in which the component was invoked.

Then, the server determines the average of the fourth number of times acquired from the plurality of terminals as the first number of times, and the average of the first historical running time acquired from the plurality of terminals as the historical running time.

In one embodiment, as illustrated in FIG. 4, in the step of S120, the operation of calculating the component weight of the first component according to the first number of times and the historical running time comprises the following steps:

In a step S121, a normalized first number of times is obtained by normalizing the first numbers of times.

In a step S122, a normalized historical running time is obtained by normalizing the historical running times.

In a step S123, the ratio of the normalized first number of times to the normalized historical running time is determined as the component weight.

Wherein, normalization is a way to simplify the calculation, that is, the dimensionless expression is transformed into a dimensionless expression into a scaler. After the first number of times Cj and the historical running time Tk are acquired, the normalized first number of times and the normalized historical running time are obtained by normalizing the first numbers of times and the historical running times. Then, the ratio of the normalized first number of times to the normalized historical running time is determined as the component weight.

In one embodiment, the server normalizes the first numbers of times Cj to obtaining the normalized first number of times C1 according to the following formula:

$$C_1 = \frac{C_j - \min(C)}{\max(C) - \min(C)},$$

Where, $C_1$ is the normalized first number of times, $C_j$ is the first number of times, $\min(C)$ is the minimum of the fourth numbers of times, $\max(C)$ is the maximum of the fourth numbers of times.

Wherein, the server determines the minimum of the fourth numbers of times as $\min(C)$, determines the maximum of the fourth numbers of times as $\max(C)$, and determines the average of the fourth numbers of times as the Cj after acquires a plurality of the fourth numbers of times. Then, the server calculates the normalized first number of times C1. It is understood that, the above formula is obtained by a machine learning algorithm.

In one embodiment, the server normalizes the historical running time to obtaining the normalized historical running time according to the following formula;

$$T_1 = \frac{T_k - \min(T)}{\max(T) - \min(T)},$$

where $T_1$ is the normalized historical running time, $T_k$ is the historical running time, $\min(T)$ is the minimum of the first running times; $\max(T)$ is the maximum of the first running times.

The server determines the minimum of the historical running times as $\min(T)$, determines the maximum of the historical running times as $\max(T)$, and determines the average of the historical running times as the Tk after acquires a plurality of the historical running times. Then, the server calculates the normalized historical running time T1. It is understood that, the above formula is obtained by a machine learning algorithm.

In one embodiment, in the step S140, the server calculates the coefficient $\omega_{ij}$ of the second component i invoking the first component j according to the component weight Wj, the second number of times Nj and the third number of times N according to the following formula:

$$\omega_{ij} = \frac{W_j \times N_j}{N},$$

Where $\omega_{ij}$ is the coefficient; $W_j$ is the component weight, $N_j$ is the second number of times, N is the third number of times.

The server calculates the coefficient $\omega_{ij}$ according to the above formula after acquires the second number of times Nj and the third number of times N and calculates the coefficient Wj. It is understood that, the above formula is obtained by a machine learning algorithm.

Figure 5:
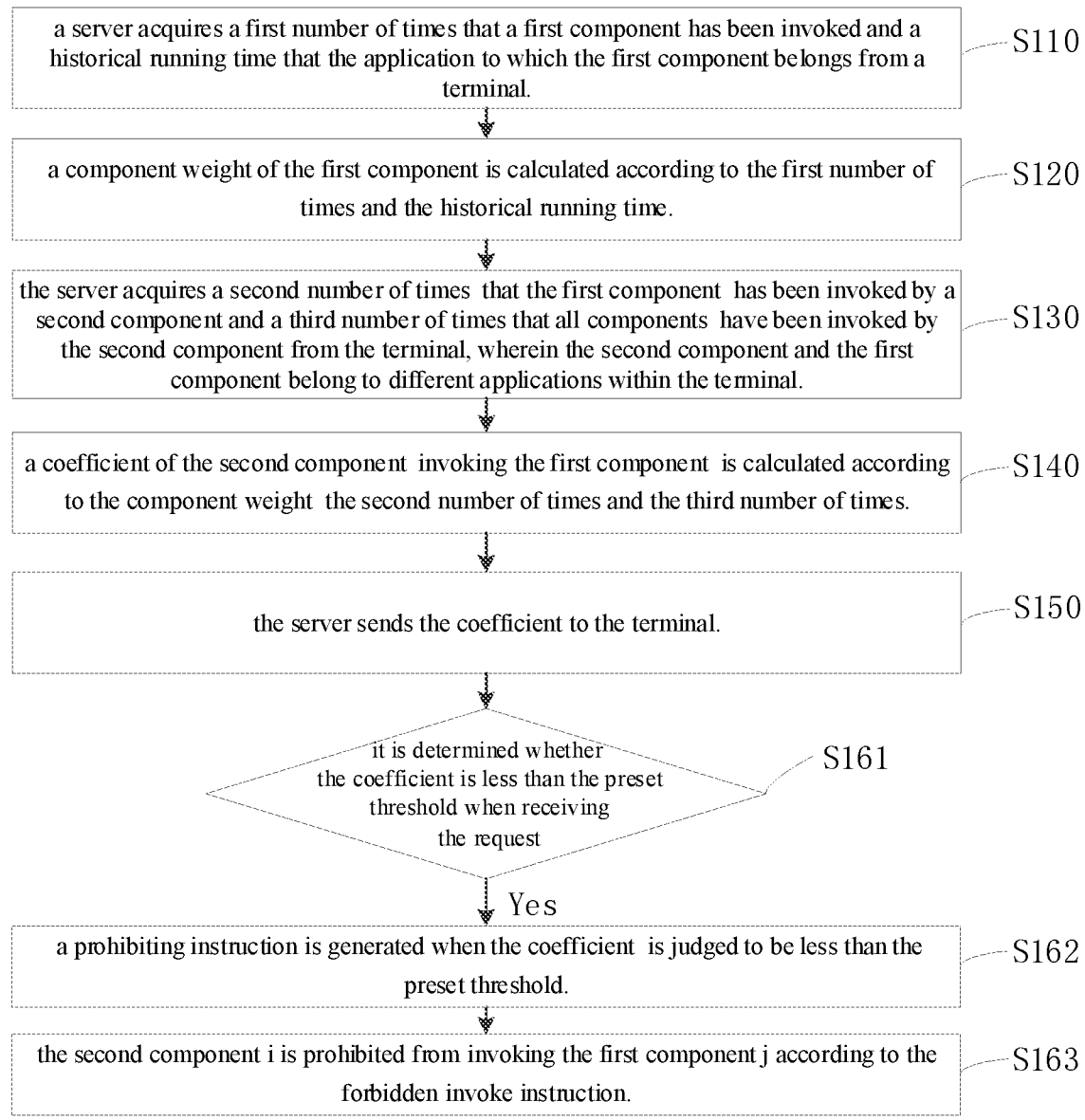
FIG. 5 is still another flowchart of a method for calculating a coefficient according to an embodiment of the present disclosure.

In one embodiment, as illustrated in FIG. 5, in the step of S160, the operation of the terminal prohibiting a request that the second component request to invoke the first component, in response to the coefficient is less than a preset threshold comprises the following steps:

In a step S161, it is determined whether the coefficient is less than the preset threshold when receiving the request.

In a step S162, a prohibiting instruction is generated when the coefficient is judged to be less than the preset threshold.

In a step S163, the second component is prohibited from invoking the first component according to the forbidden invoke instruction.

Figure 6:
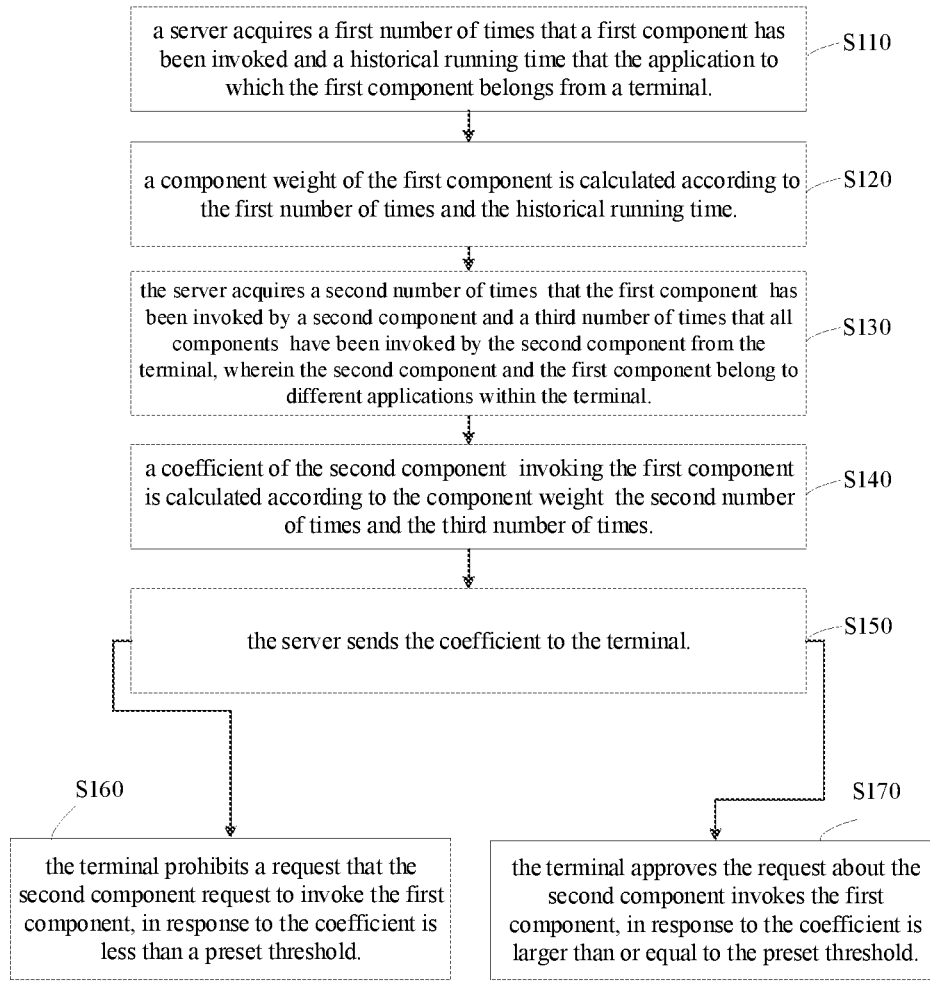
FIG. 6 is still another flowchart of a method for calculating a coefficient according to an embodiment of the present disclosure.

In one embodiment, as illustrated in FIG. 6, the method further includes the following steps.

In a step S170, the terminal approves the request about the second component invokes the first component, in response to the coefficient is larger than or equal to the preset threshold.

Figure 7:
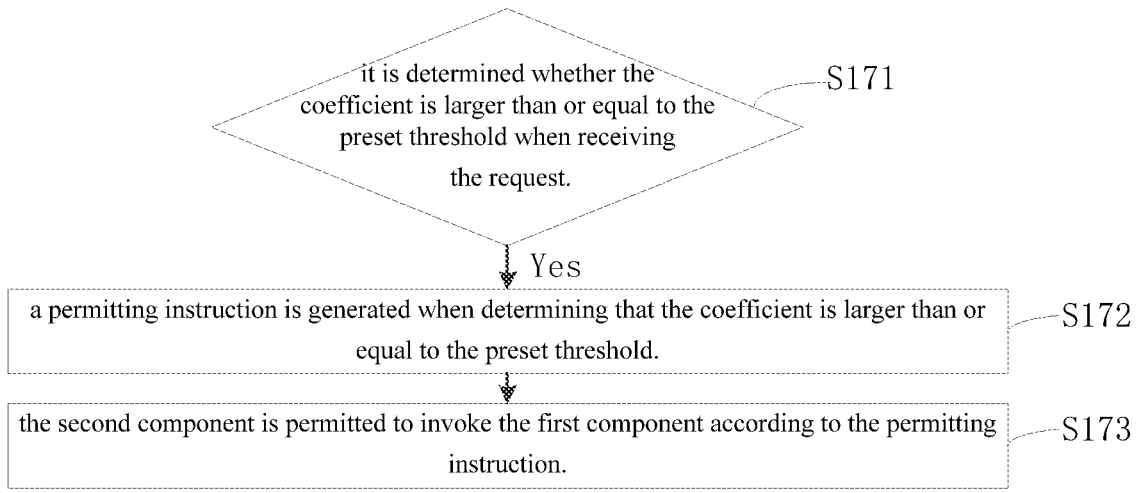
FIG. 7 is another flowchart of the step S170 according to an embodiment of the present disclosure.

In one embodiment, as illustrated in FIG. 7, in the step of S170, the operation of the terminal approving the request about the second component invokes the first component, in response to the coefficient is larger than or equal to the preset threshold comprises the following steps:

In a step S171, it is determined whether the coefficient is larger than or equal to the preset threshold when receiving the request.

In a step S172, a permitting instruction is generated when determining that the coefficient is larger than or equal to the preset threshold.

In a step S173, the second component is permitted to invoke the first component according to the permitting instruction.

It is understood that, when the server communicates with the plurality of terminals, the second number of times Nj is the sum of the first component j has been invoked by the second component i each of the plurality of terminals. And the third number of times N is the sum of numbers of times that all components have been invoked by each of the second component in the plurality of terminals.

Figure 8:
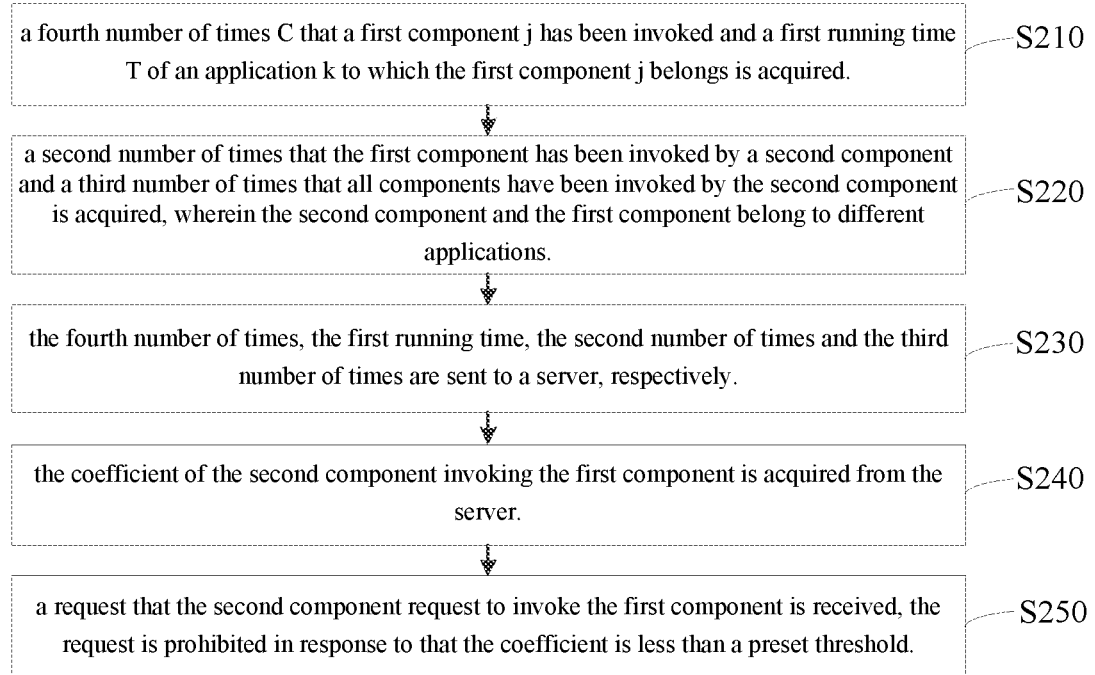
FIG. 8 is a schematic flowchart of a method for invoking a component according to an embodiment of the present disclosure.

The embodiment of the disclosure also provides a method for invoking a component, applied to a terminal. The terminal can be a smart phone, tablet computer and other devices. As illustrated in FIG. 8, The method includes the following steps:

In a step S210, a fourth number of times C that a first component j has been invoked and a first running time T of an application k to which the first component j belongs is acquired.

The first component j is a component in the application. The first component can be any kind of components of Activities, Services, Receivers, and Providers. The application including the first component is installed in the terminal. The terminal acquires the first number of times that the first component has been invoked by all the components.

On the other hand, the terminal can also acquire the historical running time Tk of the application k to which the first component j belongs. The historical running time is the sum of every running time since the application was installed, but not limited to the running time in which the application was invoked.

In one embodiment, there are log files in the terminal. The log file is used to record the historical running status of each application. The historical running status can include the runtime and runtime of each component in the application, the runtime and runtime of each component being invoked by other components, and the name of the component that invoked the component and the application to which the component that invoked the component belongs. The terminal can acquire the fourth number of times that the first component has been invoked and the first running time of the application to which the first component belongs by the log files.

In a step S220, a second number of times that the first component has been invoked by a second component and a third number of times that all components have been invoked by the second component is acquired, wherein the second component and the first component belong to different applications.

The application comprising the second component is installed in the terminal. The second component and the first component belong to different applications. The terminal can acquires the second number of times that the first component has been invoked by the second component and the third number of times that all components have been invoked by the second component. Wherein, the third number of times is the sum of the number of times that all components have been invoked by the second component.

In a step S230, the fourth number of times, the first running time, the second number of times and the third number of times are sent to a server, respectively.

The terminal can communicate with the server through wireless communication network, and the terminal can send the fourth number of times, the first running time, the second number of times and the third number of times to the server, respectively.

In a step S240, the coefficient of the second component invoking the first component is acquired from the server.

The terminal acquires the coefficient of the second component invoking the first component from the server after sent the fourth number of times, the first running time, the second number of times and the third number of times to the server.

In a step S250, a request that the second component request to invoke the first component is received, the request is prohibited in response to that the coefficient is less than a preset threshold.

The preset threshold can be a value stored in the terminal. For example, the preset threshold could be 0.5, the terminal prohibits the second component from invoking the first component when the coefficient is less than the preset threshold.

Figure 9:
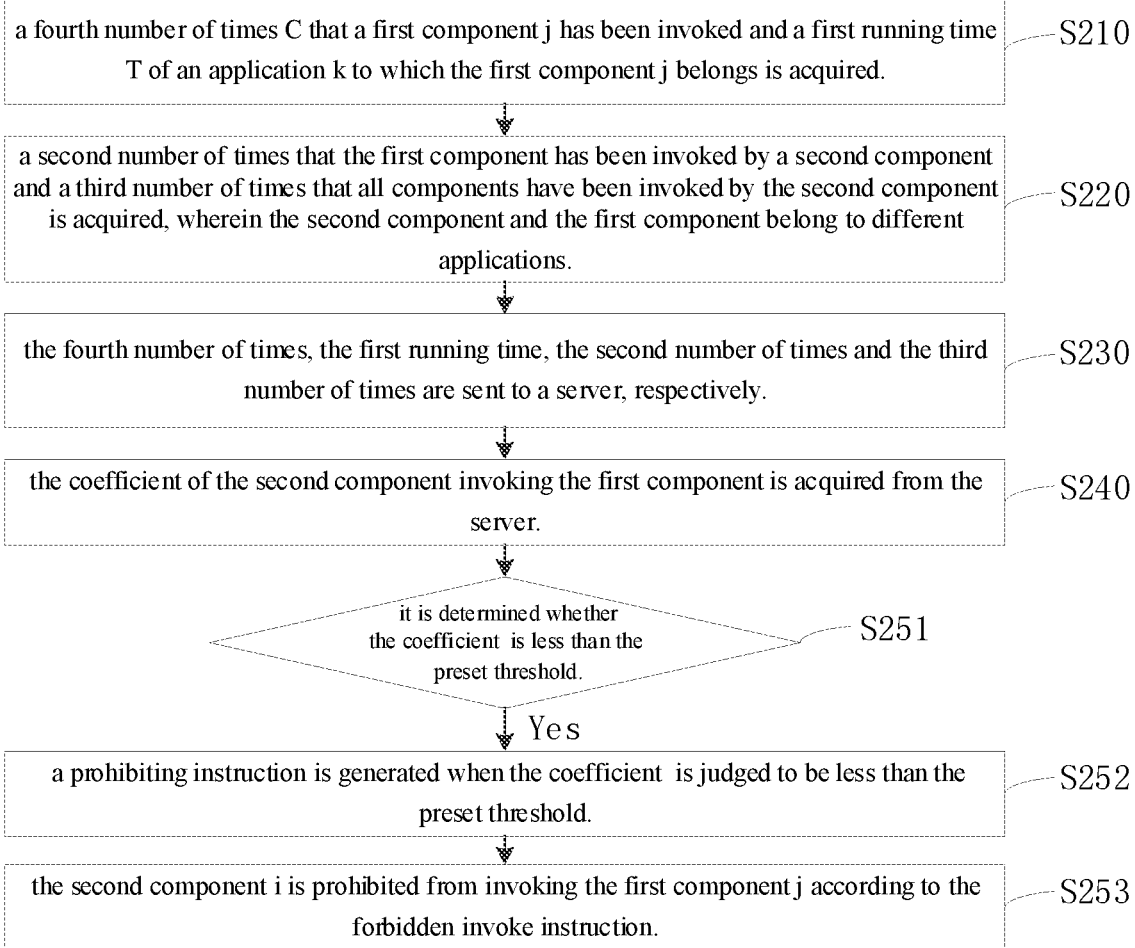
FIG. 9 is a schematic flowchart of another method for invoking a component according to an embodiment of the present disclosure.

In one embodiment, as illustrated in FIG. 9, in the step S250, the operation of receiving a request that the second component request to invoke the first component, prohibiting the request in response to that the coefficient is less than a preset threshold comprises the following steps:

In a step S251, it is determined whether the coefficient $\omega_{ij}$ is less than the preset threshold.

In a step S252, a prohibiting instruction is generated when the coefficient $\omega_{ij}$ is judged to be less than the preset threshold.

In a step S253, the second component i is prohibited from invoking the first component j according to the forbidden invoke instruction.

When the terminal acquires the coefficient $\omega_{ij}$ from the server, the coefficient $\omega_{ij}$ is compared with the preset threshold to determines whether the coefficient $\omega_{ij}$ is less than the preset threshold. The prohibiting instruction is generated when the coefficient $\omega_{ij}$ is judged to be less than the preset threshold. Then, the second component is prohibited from invoking the first component according to the prohibiting instruction.

In one embodiment, the terminal can determine whether the second component and the first component are components of a preset type or not, when the coefficient is judged to be less than the preset threshold. For example, the components of the preset type can be the Activity component.

Figure 10:
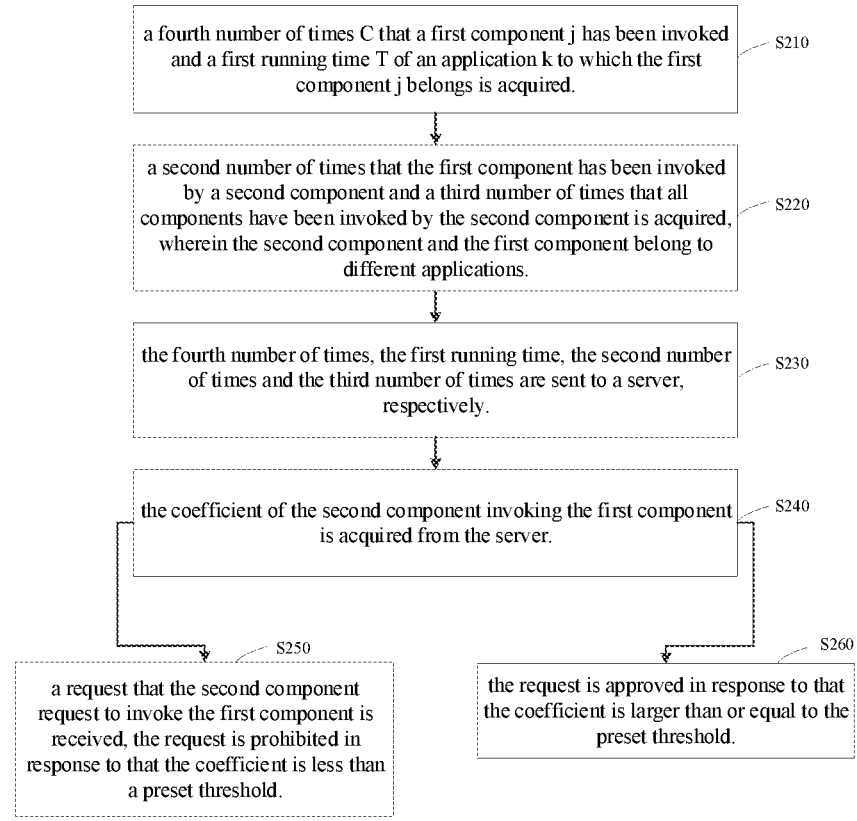
FIG. 10 is a schematic flowchart of still another method for invoking a component according to an embodiment of the present disclosure.

In one embodiment, as illustrated in FIG. 10, the method further comprises the following steps:

In a step S260: the request is approved in response to that the coefficient is larger than or equal to the preset threshold.

Figure 11:
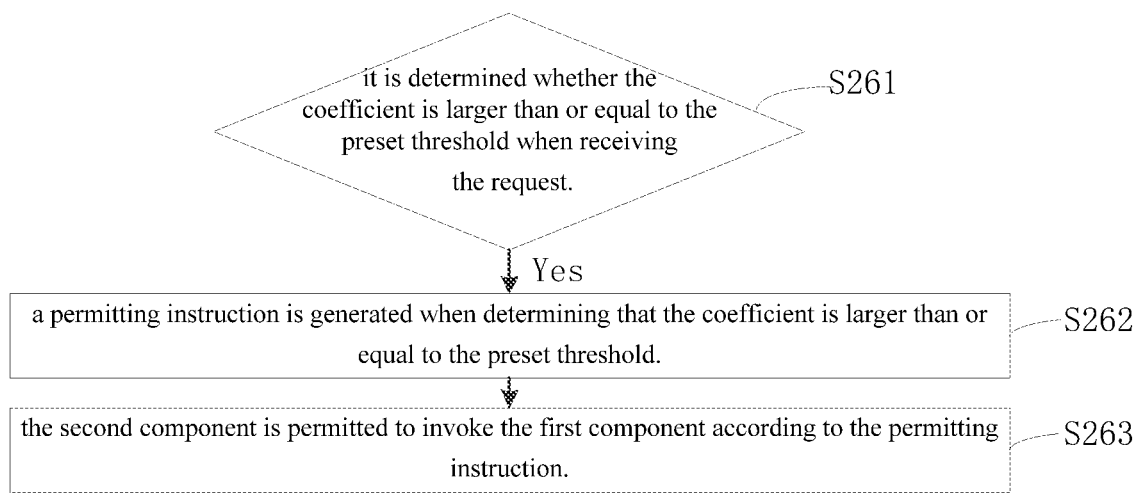
FIG. 11 is another flowchart of the step S260 according to an embodiment of the present disclosure.

In one embodiment, as illustrated in FIG. 11, in the step S260, the operation of approving the request in response to that the coefficient is larger than or equal to the preset threshold comprises the following steps:

In a step S261, it is determined whether the coefficient is larger than or equal to the preset threshold when receiving the request.

In a step S262, a permitting instruction is generated when determining that the coefficient is larger than or equal to the preset threshold.

In a step S263, the second component is permitted to invoke the first component according to the permitting instruction.

The terminal can prohibit the second component from invoking the first component when both the second component and the first component are not components of the preset type. The terminal can allow the second component to invoke the first component when at least one of the second component and the first component is components of the preset type.

Figure 12:
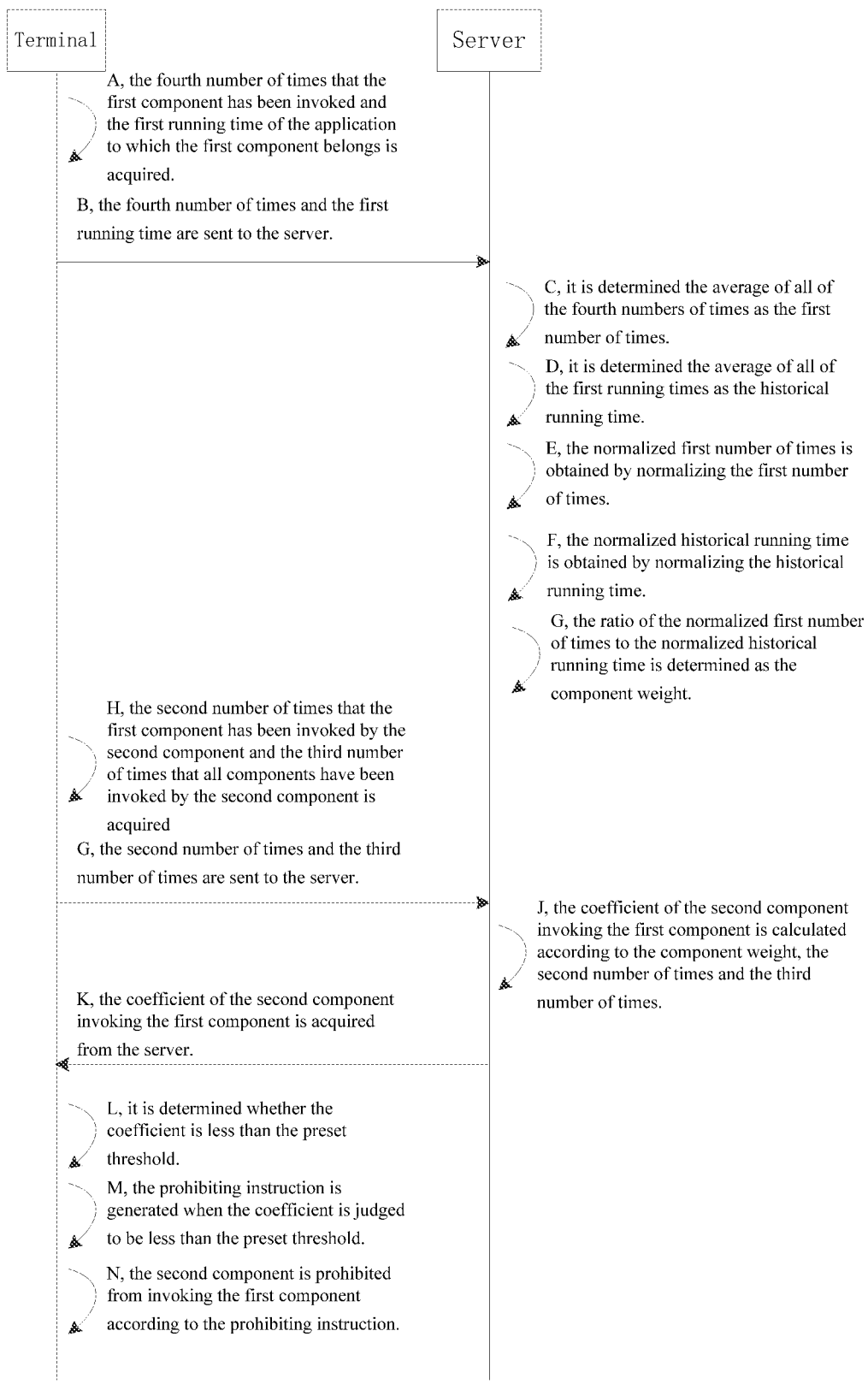
FIG. 12 is a schematic flowchart showing the interaction between a terminal and a server according to an embodiment of the present disclosure.

As illustrated in FIG. 12, FIG. 12 is schematic flowchart showing the interaction flow between the terminal and the server according to an embodiment of the present disclosure. The terminal is configured to execute the steps of: in a step A, the fourth number of times that the first component has been invoked and the first running time of the application to which the first component belongs is acquired. In a step B, the fourth number of times and the first running time are sent to the server.

Then, the server is configured to execute the following steps. In a step C, it is determined the average of all of the fourth numbers of times as the first number of times. In a step D, it is determined the average of all of the first running times as the historical running time. In a step E, the normalized first number of times is obtained by normalizing the first number of times. In a step F, the normalized historical running time is obtained by normalizing the historical running time. In a step G, the ratio of the normalized first number of times to the normalized historical running time is determined as the component weight.

Then, the terminal is configured to execute the following steps. In a step H, the second number of times that the first component has been invoked by the second component and the third number of times that all components have been invoked by the second component is acquired. In a step I, the second number of times and the third number of times are sent to the server.

Then, the server is configured to execute the following step. In a step J, the coefficient of the second component invoking the first component is calculated according to the component weight, the second number of times and the third number of times.

At last, the terminal is configured to execute the following steps. In a step K, the coefficient of the second component invoking the first component is acquired from the server. In a step L, it is determined whether the coefficient is less than the preset threshold. In a step M, the prohibiting instruction is generated when the coefficient is judged to be less than the preset threshold. In a step N, the second component is prohibited from invoking the first component according to the prohibiting instruction.

In the specific implementation, the disclosure is not limited by the order of execution of the various steps described. In the case where no conflict occurs, some steps may be performed in other orders or may be performed simultaneously.

In the method for invoking a component provided by the embodiment of the disclosure, the method including the steps of acquiring the fourth number of times that the first component has been invoked and the first running time of the application to which the first component belongs; acquiring the second number of times that the first component has been invoked by a second component and a third number of times that all components have been invoked by the second component, the second component and the first component belong to different applications; sending the fourth number of times, the first running time, the second number of times and the third number of times to the server, respectively; acquiring the coefficient of the second component invoking the first component from the server; and prohibiting the second component from invoking the first component when the coefficient is less than a preset threshold. In this embodiment, the server calculates the component weight first, then calculates the coefficient of the second component invoking the first component according to the component weight, then the terminal prohibits the second component from invoking the first component when the coefficient is less than a preset threshold. Thus, the terminal can prohibit the non-necessary component invokes, which can save the terminal system resources, and improve the operating efficiency of the terminal.

Figure 13:
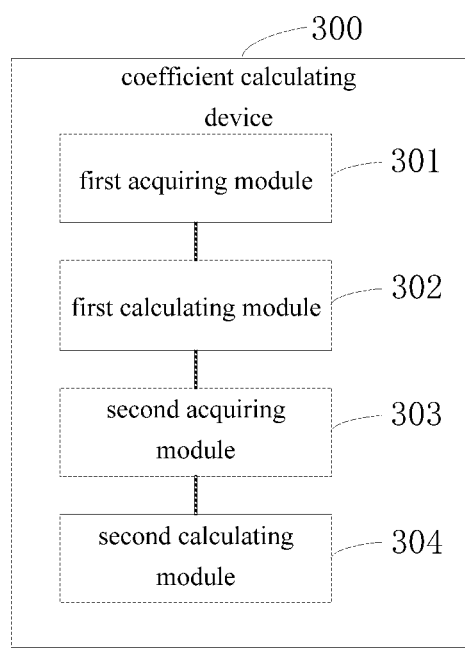
FIG. 13 is a schematic structural view of a coefficient calculating device according to an embodiment of the present disclosure.

In order to implement the above embodiments, the present disclosure also provides a coefficient calculating device, the device can be integrated into a server. As illustrated in FIG. 13, the device 300 includes a first acquiring module 301, a first calculating module 302, a second acquiring module 303 and a second calculating module 304.

The first acquiring module 301 is configured to acquire a first number of times $C_j$ that a first component j has been invoked and a historical running time $T_k$ of an application k to which the first component j belongs.

Wherein, the first component is a component in the application. The first component can be any kind of components of Activities, Services, Receivers, and Providers. The first acquiring module 301 acquires the first number of times that the first component has been invoked by other components. The first number of times includes times that the first component has been invoked by the components of other applications. In one embodiment, the first number of times further includes the times that the first component has been invoked by the other components of the application itself.

On the other hand, the first acquiring module 301 also acquire the historical running time of the application to which the first component belongs. Wherein, the historical running time is the sum of every running time since the application was installed, but not limited to the running time of the process in which the application was invoked.

The first calculating module 302 is configured to calculate a component weight $W_j$ of the first component according to the first number of times $C_j$ and the historical running time $T_k$.

The component weight $W_j$ is a parameter determined by the number of times that the first component j has been invoked and the historical running time of the application to which the first component belongs. The component weight is a parameter of the first component itself, and used to represent the relationship between the number of times of the first component has been invoked and the historical running time of the application to which the first component belongs. The component weight of different components in one application can be different. After the first acquiring module 301 acquires the first number of times and the historical running time, the component weight is calculated by the first calculating module 302 according to the first number of times and the historical running time.

The second acquiring module 303 is configured to acquire the second number of times $N_j$ that the first component j has been invoked by the second component and the third number of times that all components have been invoked by the second component, wherein the second component and the first component belong to different applications.

The second acquiring module 303 can acquires the second number of times that the first component has been invoked by the second component i. The second component and the first component belong to different applications. On the other hand, the second acquiring module 303 can acquires the third number of times that all components have been invoked by the second component. The third number of times is the sum of all the times that the second component invokes the every component.

In one embodiment, the second acquiring module 303 can acquires the number of times that each component has been invoked by the second component, and then determine the sum of the number of times invoking each component as the third number of times.

The second calculating module 304 is configured to calculate a coefficient $\omega_{ij}$ of the second component i invoking the first component j according to the component weight Wj, the second number of times Nj and the third number of times N.

After the second acquiring module 303 acquires the second number of times and the third number of times, the coefficient of the second component invoking the first component is calculated by the second calculating module 304 according to the component weight, the second number of times and the third number of times.

In the coefficient calculating device provided by the embodiment of the disclosure, after the coefficient of the second component invoking the first component is calculated by the second calculating module 304, the terminal can control the invoking between components according to the coefficient, so as to reduce the resource waste in the terminal system and improve the efficiency of the terminal.

Figure 14:
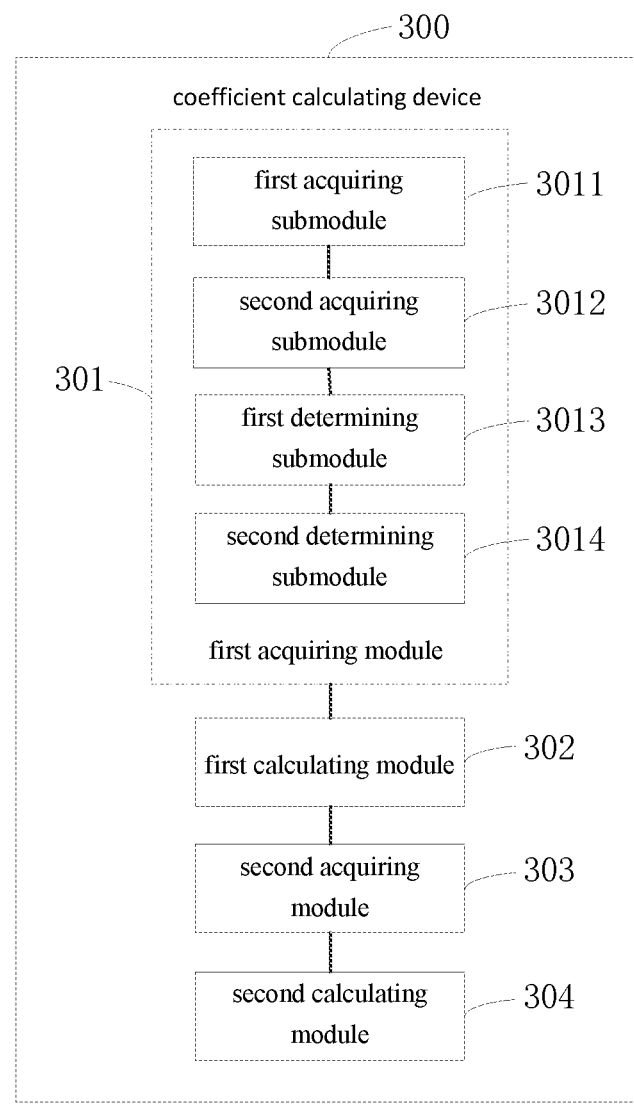
FIG. 14 is a schematic structural view of another coefficient calculating device according to an embodiment of the present disclosure.

In one embodiment, as illustrated in FIG. 14, the first acquiring module 301 includes a first acquiring submodule 3011, a second acquiring submodule 3012, a first determining submodule 3013 and a second determining submodule 3014.

The first acquiring submodule 3011 is configured to acquire a fourth number of times C that the first component has been invoked from each terminal of a plurality of terminal.

The second acquiring submodule 3012 is configured to acquire a first running time T of the application k which the first component j belongs from each terminal of the plurality of terminals.

The first determining submodule 3013 is configured to determine the average of the fourth number of times C acquired from each terminal as the first number of times Cj.

The second determining submodule 3014 is configured to determining the average of the first historical running time T of the plurality of terminals as the historical running time Tk.

Wherein, the server can communicate with the plurality of terminals, the application k including the first component j is installed on the plurality of terminals. The first acquiring submodule 3011 can acquires the fourth number of times C of the first component j has been invoked from each of the plurality of terminals. The fourth number of times C includes the number of times that the first component j has been invoked by all the component all the other application.

The second acquiring submodule 3012 can also acquire the first running time of the application to which the first component belongs from each of the plurality of terminals.

Wherein, the first running time is the sum of every running time since the application was installed, but not limited to the running time of the process in which the component was invoked.

Then, the first determining submodule 3013 determines the average of the fourth number of times acquired from the plurality of terminals as the first number of times, and the second determining submodule 3014 determines the average of the first historical running time acquired from the plurality of terminals as the historical running time.

Figure 15:
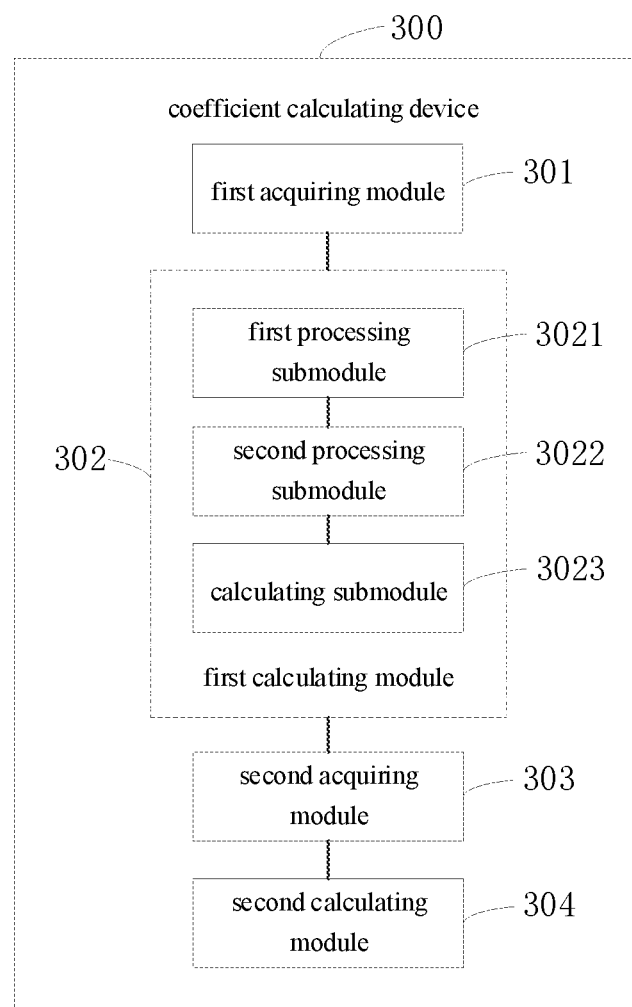
FIG. 15 is a schematic structural view of still another coefficient calculating device according to an embodiment of the present disclosure.

In one embodiment, as illustrated in FIG. 15, the first calculating module 302 includes a first processing submodule 3021, a second processing submodule 3022 and a calculating submodule 3023.

The first processing submodule 3021 is configured to obtain a normalized first number of times C1 by normalizing the first number of times Cj.

The second processing submodule 3022 is configured to obtain a normalized historical running time T1 by normalizing the historical running time Tk.

The calculating submodule 3023 is configured to determine the ratio of the normalized first number of times C1 to the normalized historical running time T1 as the component weight Wj.

Wherein, Normalization is a way to simplify the calculation, that is, the dimensionless expression is transformed into a dimensionless expression into a scaler. After the first number of times Cj and the historical running time Tk are acquired by the first acquiring module 301, the first processing submodule 3021 obtains the normalized first number of times by normalizes the first number of times, the second processing submodule 3022 obtains the normalized historical running time by normalizing the historical running time. Then, the calculating submodule 3023 determines the ratio of the normalized first number of times to the normalized historical running time as the component weight.

In one embodiment, the first processing submodule 3021 normalizes the first number of times Cj to obtaining the normalized first number of times C1 according to the following formula:

$$C_1 = \frac{C_j - \min(C)}{\max(C) - \min(C)},$$

Where $C_1$ is the normalized first number of times, $C_j$ is the first number of times, min(C) is the minimum of the fourth numbers of times, max(C) is the maximum of the fourth numbers of times.

The first processing submodule 3021 determine the minimum of the fourth numbers of times as min(C), determine the maximum of the fourth numbers of times as max(C), and determine the average of a plurality of fourth numbers of times as the Cj after the first acquiring module 301 acquires the plurality of the fourth numbers of times. Then, the first processing submodule 3021 calculates the normalized first number of times C1. It is understood that, the above formula is obtained by a machine learning algorithm.

In one embodiment, the second processing submodule 3022 normalizes the historical running time to obtaining the normalized historical running time according to the following formula.

$$T_1 = \frac{T_k - \min(T)}{\max(T) - \min(T)},$$

where $T_1$ is the normalized historical running time, $T_k$ is the historical running time, min(T) is the minimum of all of the first running times; max(T) is the maximum of all of the first running times.

The second processing submodule 3022 determines the minimum of the historical running times as min(T), determine the maximum of the historical running times as max (T), and determine the average of a plurality of historical running times as the Tk after the first acquiring module 301 acquires the plurality of the historical running times. Then, the server calculates the normalized historical running time T1. It is understood that, the above formula is obtained by a machine learning algorithm.

In one embodiment, the second calculating module 304 calculates the coefficient $\omega_{ij}$ of the second component i invoking the first component j according to the component weight Wj, the second number of times Nj and the third number of times N according to the following formula:

$$\omega_{ij} = \frac{W_j \times N_j}{N},$$

Where $\omega_{ij}$ is the coefficient; $W_j$ is the component weight, $N_j$ is the second number of times, N is the third number of times.

The second calculating module 304 calculates the coefficient $\omega_{ij}$ according to the above formula after acquires the second number of times Nj and the third number of times N and the first calculating module 302 calculates the coefficient Wj. It is understood that, the above formula is obtained by a machine learning algorithm.

It is understood that, when the server communicates with the plurality of terminals, the second number of times Nj is the sum of the first component j has been invoked by the second component i each of the plurality of terminals. And the third number of times N is the sum of numbers of times that all components have been invoked by each of the second component in the plurality of terminals.

Figure 16:
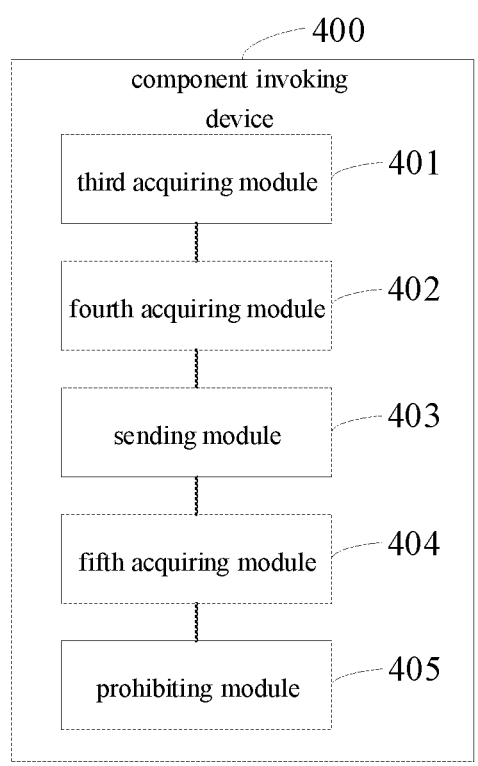
FIG. 16 is a schematic structural view of a component invoking device according to an embodiment of the present disclosure.

The embodiment of the disclosure also provides a component invoking device 400, the device 400 can be integrated into a terminal. The terminal can be a smart phone, tablet computer and other devices. Please refer to FIG. 16, the component invoking device 400 includes a third acquiring module 401, a fourth acquiring module 402, a sending module 403, a fifth acquiring module 404 and a prohibiting module 405.

The third acquiring module 401 is configured to acquire a fourth number of times that a first component has been invoked and a first running time of an application to which the first component belongs.

Wherein, the first component is a component in the application. The first component can be any kind of components of Activities, Services, Receivers, and Providers. The application comprising the first component is installed in the terminal. The third acquiring module 401 acquires the first number of times that the first component has been invoked by all the other components.

On the other hand, the third acquiring module 401 can also acquires the historical running time of the application to which the first component belongs. Wherein, the historical running time is the sum of every running time since the application was installed, but not limited to the running time of the process in which the application was invoked.

In one embodiment, there are log files in the terminal. The log file is used to record the historical running status of each application. The historical running status can include the runtime and runtime of each component in the application, the runtime and runtime of each component being invoked by other components, and the name of the component that invoked the component and the application to which the component that invoked the component belongs. The third acquiring module 401 can acquires the fourth number of times that the first component has been invoked and the first running time of the application to which the first component belongs by the log files.

The fourth acquiring module 402 is configured to acquire a second number of times that the first component has been invoked by a second component and a third number of times that all components have been invoked by the second component, wherein the second component and the first component belong to different applications.

The application comprising the second component is installed in the terminal. The second component and the first component belong to different applications. The fourth acquiring module 402 can acquires the second number of times of the first component has been invoked by the second component and the third number of times that all components have been invoked by the second component. Wherein, the third number of times is the sum of the number of times that all components have been invoked by the second component.

The sending module 403 is configured to send the fourth number of times, the first running time, the second number of times and the third number of times to a server, respectively.

Wherein, the terminal can communicate with the server through wireless communication network, and the sending module 403 can sends the fourth number of times, the first running time, the second number of times and the third number of times to the server, respectively.

The fifth acquiring module 404 is configured to acquire a coefficient of the second component invoking the first component from the server.

Wherein, the fifth acquiring module 404 acquires the coefficient of the second component invoking the first component from the server after the sending module 403 sent the fourth number of times, the first running time, the second number of times and the third number of times to the server.

The prohibiting module 405 is configured to prohibit the second component from invoking the first component when the coefficient is less than the preset threshold.

The preset threshold can be a value stored in the terminal. For example, the preset threshold could be 0.5, the prohibiting module 405 prohibits the second component from invoking the first component when the coefficient which the fifth acquiring module 404 acquired is less than the preset threshold.

Figure 17:
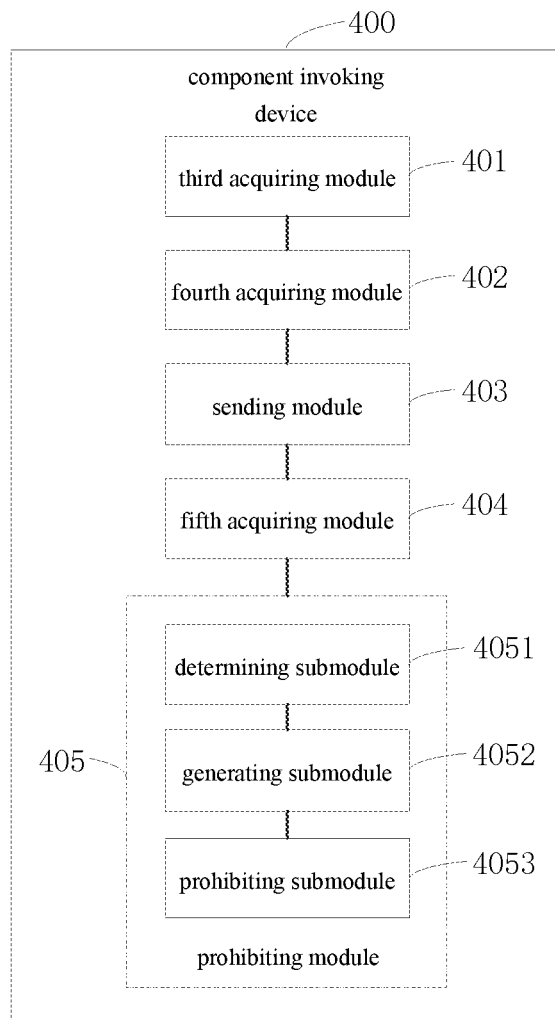
FIG. 17 is a schematic structural view of another component invoking device according to an embodiment of the present disclosure.

In one embodiment, as illustrated in FIG. 17, the prohibiting module 405 includes a determining submodule 4051, a generating submodule 4052 and a prohibiting submodule 4053.

The determining submodule 4051 is configured to determine whether the coefficient is less than the preset threshold.

The generating submodule 4052 is configured to generate a prohibiting instruction when determining that the coefficient is less than the preset threshold.

The prohibiting submodule 4053 is configured to prohibit the second component from invoking the first component according to the prohibiting instruction.

When the fifth acquiring module 404 acquires the coefficient from the server, the coefficient is compared with the preset threshold to determine whether the coefficient is less than the preset threshold by the determining submodule 4051. The generating submodule 4052 generates the prohibiting instruction when the coefficient is judged to be less than the preset threshold. Then, the prohibiting submodule 4053 prohibits the second component from invoking the first component according to the prohibiting instruction.

In one embodiment, the prohibiting module 405 can determines whether the second component and the first component are components of the preset type when the coefficient is judged to be less than the preset threshold. Wherein, the components of the preset type can be Activity component.

The prohibiting module 405 can prohibits the second component from invoking the first component when both the second component and the first component are not components of the preset type. The prohibiting module 405 can allows the second component to invoke the first component when at least one of the second component and the first component is components of the preset type.

In concrete implementation, the above modules can be implemented as independent entities, or any combination, as one or several entities.

In the component invoking device 400 provided by the embodiment of the disclosure, the device including the modules of the third acquiring module 401 configured to acquire the fourth number of times that the first component has been invoked and the first running time of the application to which the first component belongs; the fourth acquiring module 402 configured to acquire the second number of times of the first component has been invoked by the second component and a third number of times that all components have been invoked by the second component, wherein the second component and the first component belong to different applications; the sending module 403 configured to send the fourth number of times, the first running time, the second number of times and the third number of times to the server, respectively; the fifth acquiring module 404 configured to acquire the coefficient of the second component invoking the first component from the server and the prohibiting module 405 configured to prohibit the second component from invoking the first component when the coefficient is less than the preset threshold. In this embodiment, the server calculates the component weight first, then calculates the coefficient of the second component invoking the first component according to the component weight, then the terminal prohibits the second component from invoking the first component when the coefficient is less than a preset threshold. Thus, the terminal can prohibit the non-necessary component invokes, which can save the terminal system resources, and improve the operating efficiency of the terminal.

Figure 18:
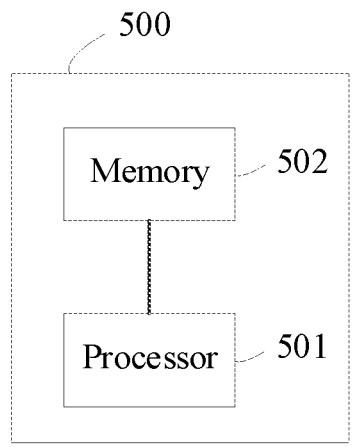
FIG. 18 is a schematic structural view of a server according to an embodiment of the present disclosure.

The present disclosure also provides a server, as illustrated in FIG. 18, the server 500 includes a processor 501 and a memory 502, the processor 501 is connected to the memory 502.

The processor 501 is a control center of the server 500, which connects various parts of the entire server 500 by various interfaces and lines. The processor 501 performs overall monitoring of the server 500 by running or loading an application stored in the memory 502, and invoking data stored in the memory 502, performing various functions of the server and processing data.

In this embodiment, the memory 502 is configured to store instructions, when the instructions stored in the memory 502 are invoked, the processor 501 is configured to execute the steps of:

acquiring a first number of times that a first component has been invoked and a historical running time of the application to which the first component belongs; calculating a component weight of the first component according to the first number of times and the historical running time; acquiring a second number of times of the first component has been invoked by a second component and a third number of times that all components have been invoked by the second component, wherein the second component and the first component belong to different applications; and calculating a coefficient of the second component invoking the first component according to the component weight, the second number of times and the third number of times.

In one embodiment, when the operation of acquiring the first number of times that the first component has been invoked and the historical running time of the application to which the first component belongs is performed, the processor 501 is configured to execute the steps of: acquiring a fourth number of times that the first component has been invoked from each of the plurality of terminals; acquiring a first running time of the application to which the first component belongs from each of the plurality of terminals; determining the average of the fourth number of times acquired from each of the plurality of terminals as the first number of times; and determining the average of the first historical running time acquired from the plurality of terminals as the historical running time.

In one embodiment, when the operation of calculating the component weight that the first component according to the first number of times and the historical running time is performed, the processor 501 is configured to execute the steps of: obtaining the normalized first number of times by normalizing the first number of times; obtaining the normalized historical running time by normalizing the historical running time; and determining the ratio of the normalized first number of times to the normalized historical running time as the component weight.

In one embodiment, the processor 501 is configured to execute the steps of obtaining the normalized first number of times by normalizing the first number of times according to the following formula.

$$C_1 = \frac{C_j - \min(C)}{\max(C) - \min(C)},$$

where, $C_1$ is the normalized first number of times, $C_j$ is the first number of times, $\min(C)$ is the minimum of the fourth numbers of times, $\max(C)$ is the maximum of the fourth numbers of times.

In one embodiment, the processor 501 is configured to execute the steps of obtaining the normalized historical running time by normalizing the historical running time according to the following formula.

$$T_1 = \frac{T_k - \min(T)}{\max(T) - \min(T)},$$

where $T_1$ is the normalized historical running time, $T_k$ is the historical running time, $\min(T)$ is the minimum of the first running times; $\max(T)$ is the maximum of the first running times.

In one embodiment, the processor 501 is configured to execute the steps of calculating a coefficient of the second component invoking the first component according to the component weight, the second number of times and the third number of times according to the following formula:

$$\omega_{ij} = \frac{W_j \times N_j}{N},$$

where $\omega_{ij}$ is the coefficient; $W_j$ is the component weight, $N_j$ is the second number of times, N is the third number of times.

The memory 502 is configured to store applications and data, the memory 502 stores applications that contain instructions that can be executed in the processor 501. Applications can be composed of various functional modules. The processor 501 performs various functional applications and data processing by running applications stored in the memory 502.

In the server 500 provided by the embodiment of the disclosure, after the coefficient of the second component invoking the first component is calculated by the server 500, the terminal can control the invoking between components according to the coefficient, so as to reduce the resource waste in the terminal system and improve the efficiency of the terminal.

Figure 19:
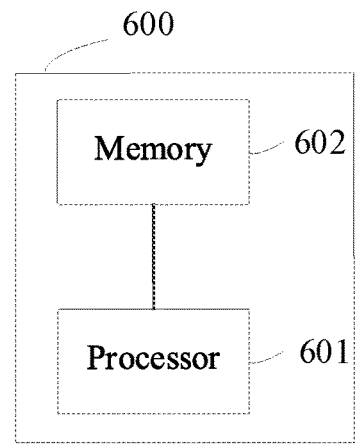
FIG. 19 is a schematic structural view of a terminal according to an embodiment of the present disclosure.

The present disclosure also provides a terminal, the terminal can be a smart phone, tablet computer and other devices. As illustrated in FIG. 19, the terminal 600 includes a processor 601 and a memory 602, the processor 601 is connected to the memory 602.

The processor 601 is a control center of the terminal 600, which connects various parts of the entire terminal 600 by various interfaces and lines. The processor 601 performs overall monitoring of the terminal 600 by running or loading an application stored in the memory 602, and invoking data stored in the memory 602, performing various functions of the terminal 600 and processing data.

In this embodiment, the memory 602 is configured to store instructions, when the instructions stored in the memory 602 are invoked, the processor 601 is configured to execute the steps of:

Acquiring a fourth number of times that a first component has been invoked and a first running time of an application to which the first component belongs; acquiring a second number of times that the first component has been invoked by a second component and a third number of times that all components have been invoked by the second component, wherein the second component and the first component belong to different applications; sending the fourth number of times, the first running time, the second number of times and the third number of times to a server, respectively; acquiring a coefficient of the second component invoking the first component from the server; and prohibiting the second component from invoking the first component when the coefficient is less than the preset threshold.

In one embodiment, when the operation of prohibiting the second component from invoking the first component when the coefficient is less than the preset threshold is performed, the processor 601 is configured to execute the steps of: determining whether the coefficient is less than the preset threshold; generating a prohibiting instruction when determining that the coefficient is less than the preset threshold; and prohibiting the second component from invoking the first component according to the prohibiting instruction.

The memory 602 is configured to store applications and data, the memory 602 stores applications that contain instructions that can be executed in the processor 601. Applications can be composed of various functional modules. The processor 601 performs various functional applications and data processing by running applications stored in the memory 602.

In one embodiment, as illustrated in FIG. 15, the terminal 600 further includes a radio frequency circuit 603, a display 604, a control circuit 605, a input unit 606, an audio circuit 607, a sensor 608 and a power supply 609. The processor 601 is connected to the radio frequency circuit 603, the display 604, the control circuit 605, the input unit 606, the audio circuit 607, the sensor 608 and the power supply 609.

The radio frequency circuit 603 is configured to send and receive radio frequency signals to communicate with the server or other electronic devices through wireless communication networks.

The display screen 604 can be used to display information entered by the user or information provided to the user as well as various graphical user interfaces of the terminal, which can be composed of images, text, icons, video, and any combination thereof.

The control circuit 605 is connected to the display 604 to control the display 604 to display information.

The input unit 606 is configured to receive input numbers, character information, or user characteristic information (e.g., fingerprints), and to generate signal input of keyboard, mouse, joystick, optical, or trackball related to user settings and function controls.

The audio circuit 607 can provide audio interface between user and terminal through loudspeaker and microphone.

The sensor 608 is used to collect information about the external environment. The sensor 608 may include one or more of the ambient brightness sensors, acceleration sensors, gyroscopes and other sensors.

The power supply 609 is used to power the components of the terminal 600. In one embodiment, power supply 609 may be connected to the processor 601 logic through a power management system, thereby achieving functions such as managing charge, discharge, and power management through the power management system.

Figure 20:
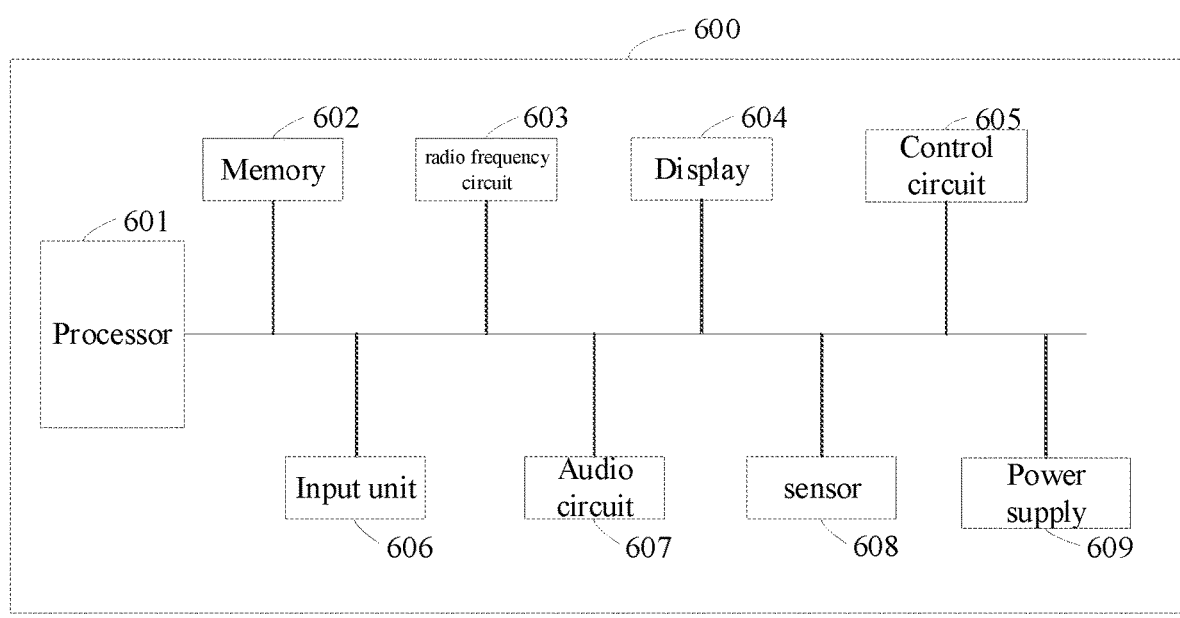
FIG. 20 is a schematic structural view of another terminal according to an embodiment of the present disclosure.

Although not shown in FIG. 20, the terminal 600 can also include cameras, bluetooth modules, and so on.

In the terminal provided by the embodiment of the disclosure, the terminal is configured to execute the steps of: acquiring the fourth number of times that the first component has been invoked and the first running time of the application to which the first component belongs; acquiring the second number of times that the first component has been invoked by the second component and the third number of times that all components have been invoked by the second component, wherein the second component and the first component belong to different applications; sending the fourth number of times, the first running time, the second number of times and the third number of times to the server, respectively; acquiring a coefficient of the second component invoking the first component from the server; and receiving a request that the second component request to invoke the first component, prohibiting the request in response to that the coefficient is less than a preset threshold. The terminal can control the invoking between components according to the coefficient, so as to reduce the resource waste in the terminal system and improve the efficiency of the terminal.

In one embodiment, the operation of receiving a request that the second component request to invoke the first component, prohibiting the request in response to that the coefficient is less than a preset threshold comprises: determining whether the coefficient is less than the preset threshold, generating a prohibiting instruction when determining that the coefficient is less than the preset threshold, and prohibiting the second component from invoking the first component according to the prohibiting instruction.

In one embodiment, the terminal is configured to execute the further steps of: approving the request in response to that the coefficient is larger than or equal to the preset threshold.

In one embodiment, the operation of approving the request in response to that the coefficient is larger than or equal to the preset threshold comprises: determining whether the coefficient is large than or equal to the preset threshold, generating a permitting instruction when determining that the coefficient is large than or equal to the preset threshold, and permitting the second component to invoke the first component according to the permitting instruction.

The present disclosure also provides a storage medium with instructions stored therein, when the instruction is executed by a processor, the method for calculating a coefficient described in the above embodiment is performed.

The present disclosure also provides a storage medium with instructions stored therein, when the instruction is executed by a processor, the method for invoking a component described in the above embodiment is performed.

It should be noted, ordinary skill in the art can understand that all or part of the steps carried by the method of implementing the above embodiments can be completed by a program to instruct related hardware, and the program can be stored in a computer readable storage medium, the storage medium include the following: random access memory (RAM), read only memory (ROM), magnetic disk or optical disk or the like.

Above is a detailed introduction of the method for calculating coefficient, method for invoking component, device, storage medium, server and terminal provided by the embodiment of the invention. In this paper, specific examples are applied to elaborate the principle and implementation mode of the invention. The explanation of the above embodiments is only used to help understand the method of the invention and its core idea; meanwhile, for technicians in the field, according to the idea of the invention, there will be changes in the specific implementation mode and application scope. In conclusion, the contents of this specification shall not be interpreted as restrictions on the invention.

What is claimed is:

1. A method for invoking a component, the method comprising:
    a server acquiring, from a terminal, a first number of times that a first component has been invoked and a historical running time of an application to which the first component belongs;
    calculating a component weight of the first component according to the first number of times and the historical running time;
    the server acquiring, from the terminal a second number of times that the first component has been invoked by a second component and a third number of times that all components have been invoked by the second component, wherein the second component and the first component belong to different applications;
    calculating a coefficient of the second component invoking the first component, according to the component weight, the second number of times and the third number of times;
    the server sending the coefficient to the terminal; and
    the terminal prohibiting a request that the second component request to invoke the first component, in response to the coefficient is less than a preset threshold.

2. The method of claim 1, wherein the operation of a server acquiring, from a terminal, the first number of times that the first component has been invoked and a historical running time of an application to which the first component belongs comprises:
    acquiring a fourth number of times that the first component has been invoked from each of a plurality of terminals;
    acquiring a first running time of the application to which the first component belongs from each of the plurality of terminals;
    determining the average of the fourth number of times acquired from the plurality of terminals as the first number of times; and
    determining the average of the first historical running time acquired from the plurality of terminals as the historical running time.

3. The method of claim 2, wherein the operation of calculating the component weight of the first component according to the first number of times and the historical running time comprises:
    obtaining a normalized first number of times by normalizing the first numbers of times;
    obtaining a normalized historical running time by normalizing the historical running times; and
    determining the ratio of the normalized first number of times to the normalized historical running time as the component weight.

4. The method of claim 3, wherein the operation of obtaining the normalized first number of times by normalizing the first numbers of times according to the following formula;

$$C_1 = \frac{C_j - \min(C)}{\max(C) - \min(C)},$$

where $C_1$ is the normalized first number of times, $C_j$ is the first number of times, $\min(C)$ is the minimum of the fourth numbers of times, $\max(C)$ is the maximum of the fourth numbers of times.

5. The method of claim 3, wherein the operation of obtaining the normalized historical running time by normalizing the historical running times according to the following formula:

$$T_1 = \frac{T_k - \min(T)}{\max(T) - \min(T)},$$

where $T_1$ is the normalized historical running time, $T_k$ is the historical running time, $\min(T)$ is the minimum of the first running times; $\max(T)$ is the maximum of the first running times.

6. The method of claim 1, wherein the operation of calculating the coefficient of the second component invoking the first component according to the component weight, the second number of times and the third number of times according to the following formula;

$$\omega_{ij} = \frac{W_j \times N_j}{N},$$

where $\omega_{ij}$ is the coefficient; $W_j$ is the component weight, $N_j$ is the second number of times, N is the third number of times.

7. The method of claim 1, wherein the operation of the terminal prohibiting a request that the second component request to invoke the first component, in response to the coefficient is less than a preset threshold comprises:
the terminal determining whether the coefficient is less than the preset threshold when receiving the request;
generating a prohibiting instruction when determining that the coefficient is less than the preset threshold; and
prohibiting the second component from invoking the first component according to the prohibiting instruction.

8. The method of claim 1, the method further comprising:
the terminal approving the request about the second component invokes the first component, in response to the coefficient is larger than or equal to the preset threshold.

9. The method of claim 8, wherein the operation of the terminal approving the request about the second component invokes the first component, in response to the coefficient is larger than or equal to the preset threshold comprises:
the terminal determining whether the coefficient is larger than or equal to the preset threshold when receiving the request;
generating a permitting instruction when determining that the coefficient is larger than or equal to the preset threshold; and
permitting the second component to invoke the first component according to the permitting instruction.

10. A method for invoking a component, applied to a terminal, the method comprising:
acquiring a fourth number of times that a first component has been invoked and a first running time of an application to which the first component belongs;
acquiring a second number of times that the first component has been invoked by a second component and a third number of times that all components have been invoked by the second component, wherein the second component and the first component belong to different applications;
sending the fourth number of times, the first running time, the second number of times and the third number of times to a server, respectively;
acquiring a coefficient of the second component invoking the first component from the server; and
receiving a request that the second component request to invoke the first component, and prohibiting the request in response to that the coefficient is less than a preset threshold.

11. The method of claim 10, wherein the operation of receiving a request that the second component request to invoke the first component, and prohibiting the request in response to that the coefficient is less than a preset threshold comprises:
determining whether the coefficient is less than the preset threshold;
generating a prohibiting instruction when determining that the coefficient is less than the preset threshold; and
prohibiting the second component from invoking the first component according to the prohibiting instruction.

12. The method of claim 10, the method further comprising:
approving the request in response to that the coefficient is larger than or equal to the preset threshold.

13. The method of claim 12, wherein the operation of approving the request in response to that the coefficient is larger than or equal to the preset threshold comprises:
determining whether the coefficient is larger than or equal to the preset threshold;
generating a permitting instruction when determining that the coefficient is larger than or equal to the preset threshold; and
permitting the second component to invoke the first component according to the permitting instruction.

14. The method of claim 10, wherein the coefficient of the second component invoking the first component is calculated according to a component weight, the second number of times and the third number of times, and the component weight is calculated according to the fourth number of times and the first running time.

15. The method of claim 14, wherein the coefficient of the second component invoking the first component is calculated according to the formula:

$$\omega_{ij} = \frac{W_j \times N_j}{N},$$

where $\omega_{ij}$ is the coefficient; $W_j$ is the component weight, $N_j$ is the second number of times, N is the third number of times.

16. The method of claim 14, wherein the component weight is calculated by the operations of:
determining the average of the fourth number of times acquired from a plurality of terminals as the first number of times;
obtaining the normalized first number of times by normalizing the first numbers of times;
determining the average of the first historical running time acquired from the plurality of terminals as the historical running time;
obtaining the normalized historical running time by normalizing the historical running times; and
determining the ratio of the normalized first number of times to the normalized historical running time as the component weight.

17. A terminal, comprising: a memory and a processor, the processor is connected with the memory, the memory is configured to store instructions, when the instructions stored in the memory are invoked, the processor is configured to execute the steps of:
acquiring a fourth number of times that a first component has been invoked and a first running time of an application to which the first component belongs;
acquiring a second number of times that the first component has been invoked by a second component and a third number of times that all components have been invoked by the second component, wherein the second component and the first component belong to different applications;
sending the fourth number of times, the first running time, the second number of times and the third number of times to a server, respectively;
acquiring a coefficient of the second component invoking the first component from the server; and
receiving a request that the second component request to invoke the first component, and prohibiting the request in response to that the coefficient is less than a preset threshold.

18. The terminal of claim 17, wherein the operation of receiving a request that the second component request to invoke the first component, and prohibiting the request in response to that the coefficient is less than a preset threshold comprises:
- determining whether the coefficient is less than the preset threshold;
- generating a prohibiting instruction when determining that the coefficient is less than the preset threshold; and
- prohibiting the second component from invoking the first component according to the prohibiting instruction.

19. The terminal of claim 17, wherein the processor is configured to execute the operation of:
- approving the request in response to that the coefficient is larger than or equal to the preset threshold.

20. The terminal of claim 19, wherein the operation of approving the request in response to that the coefficient is larger than or equal to the preset threshold comprises:
- determining whether the coefficient is large than or equal to the preset threshold;
- generating a permitting instruction when determining that the coefficient is large than or equal to the preset threshold; and
- permitting the second component to invoke the first component according to the permitting instruction.

* * * * *